United States Patent [19]
Faust

[11] 3,815,617
[45] June 11, 1974

[54] CONTINUOUS PLATING SYSTEM
[75] Inventor: Elbert R. Faust, Litchfield, Conn.
[73] Assignee: The Buehler Corporation, Indianapolis, Ind.
[22] Filed: June 29, 1972
[21] Appl. No.: 267,497

Related U.S. Application Data
[60] Division of Ser. No. 120,635, March 3, 1971, Pat. No. 3,699,985, which is a continuation-in-part of Ser. No. 796,033, Feb. 3, 1969, Pat. No. 3,616,423.

[52] U.S. Cl............... 134/133, 134/140, 134/164, 204/198
[51] Int. Cl............................................. B08b 3/04
[58] Field of Search.......... 134/58 R, 140, 141, 133, 134/160, 161, 164; 204/198, 222

[56] References Cited
UNITED STATES PATENTS

| | | |
|---|---|---|
| 815,027 | 3/1906 | Meaker .............................. 204/198 |
| 913,747 | 3/1909 | Meaker .............................. 204/198 |
| 2,164,710 | 7/1939 | Hatch ................................ 204/198 |
| 2,752,926 | 7/1956 | James ................................ 134/133 |
| 3,616,423 | 10/1971 | Faust ................................ 204/198 |

Primary Examiner—Robert L. Bleutge
Attorney, Agent, or Firm—Trask, Jenkins & Hanley

[57] ABSTRACT

A system for the continuous plating, cleaning or rinsing of articles wherein all surfaces of the articles are uniformly and entirely exposed to the fluid through which they are conveyed. A trough suspended within a fluid bath is operative to cyclically move forward and upward and abruptly return to its initial position thereby to cause articles in the trough to inertially fall to positions successively forward of the trough and in new positions with respect to the trough and other articles.

10 Claims, 12 Drawing Figures

PATENTED JUN 11 1974　3,815,617
SHEET 3 OF 4

CONTINUOUS PLATING SYSTEM

FIELD OF THE INVENTION

This application is a division of co-pending application Ser. No. 120,635, filed Mar. 3, 1971, now U.S. Pat. No. 3,699,985 which is in turn a continuation-in-part of application Ser. No. 796,033, filed Feb. 3, 1969, now U.S. Pat. No. 3,616,423, issued Oct. 26, 1971. This invention relates to electroplating systems and more specifically to systems especially useful for the continuous plating, cleaning and rinsing of small articles.

BACKGROUND OF THE INVENTION

Articles to be electroplated are conventionally processed on a batch basis. In one well known electroplating system, items to be plated are loaded into a basket which is transported by means of an elaborate manually or automatically controlled conveyor mechanism through the necessary cleaning, plating and rinsing baths. In another known plating system, items are loaded into a rotatable barrel which is then lowered into a plating solution and rotated therein to plate the items contained within the barrel. These plating systems are rather complex and, since they operate on a batch-by-batch basis, are limited in the speed with which placing can be effected. The inherent slowness of these conventional systems, together with the additional labor required in loading and unloading items being processed, increases the cost of plating and correspondingly adds to the cost of articles so plated. Moreover, it is often difficult by such conventional techniques and systems to provide a complete and uniform coating on articles, especially on relatively small articles such as electronic components. In addition, conventional systems can often damage or tangle items being processed since the items are usually tumbled or agitated to provide uniform coating.

SUMMARY OF THE INVENTION

In accordance with the present invention, a continuous electroplating system is provided wherein small articles are efficiently, uniformly and entirely plated by apparatus which is relatively simple and yet especially adapted for high volume continuous production plating. The system comprises a novel and particularly effective conveyor assembly operative to transport items to be plated in an essentially continuous manner through a plating bath and in a manner which achieves uniform coating with substantially no damage to the items. A trough is suspended or mounted within a plating bath and is operative to cyclically move forward and upward in a smooth manner and abruptly return to an initial or rest position such that items resting within the trough are carried forward and upward during the smooth movement of the trough without changing position, and as the trough abruptly returns to its rest position, the items are caused to inertially fall to new positions forwardly of the trough. The items progress through the plating solution in this periodic manner randomly falling to new positions during each return motion of the trough. In practice, items to be plated are loaded into the supply end of the trough by suitable conveyor means, the items advancing through the plating bath by the periodic inertial motion just described. Plated items leave the trough at the discharge end of the bath by similar periodic motion and are deposited onto suitable conveyor means for transport out of the plating solution and into subsequent cleaning or rinsing baths, as required in a particular process.

The trough is generally fabricated of an electrically insulative material compatible with the plating solution employed and has an electrode structure provided in the floor thereof which is constructed to suit particular process requirements. The novel system operation permits relatively simple replenishment of plating fluid, and permits efficient arrangement of electrodes within the plating bath. The invention can also be employed in cleaning and rinsing baths of an electroplating system to uniformly process the items, and in useful generally for the processing of items where uniform and complete exposure to an immersing fluid, which can be liquid or gas, is desired.

DESCRIPTION OF THE DRAWINGS

The invention will be more fully understood from the following detailed description taken in conjunction with the accompanying drawings, in which:

FIG. 11 is a somewhat diagrammatic view in elevation of one arrangement of a control for the apparatus of FIG. 4.

DETAILED DESCRIPTION OF THE INVENTION

Figure 1:
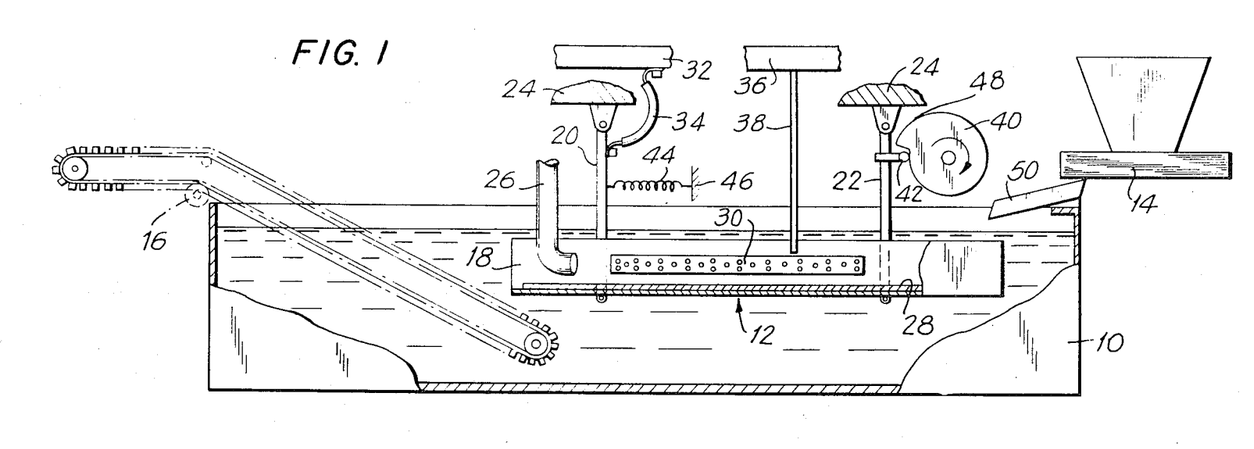
FIG. 1 is a diagrammatic elevation view of a plating system according to the invention.
Figure 2:
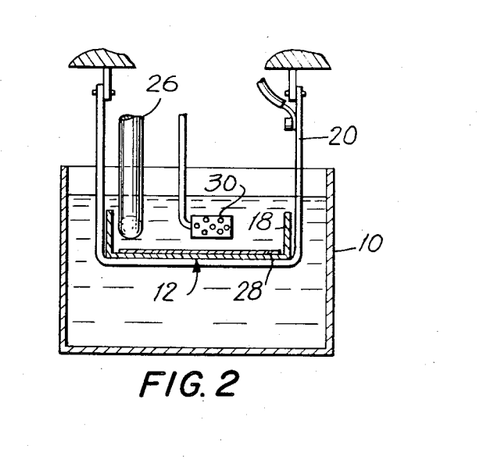
FIG. 2 is a sectional end view of the plating system of FIG. 1.
Figure 2:
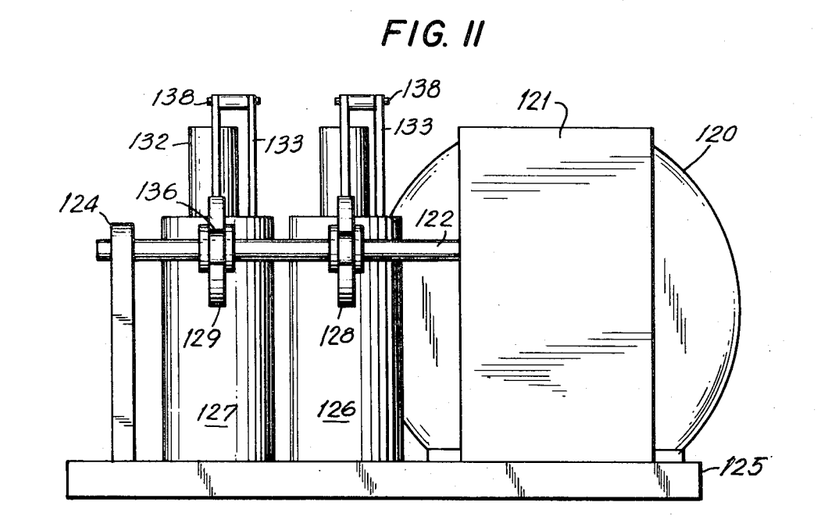

A plating system especially useful for the continuous plating of small articles is illustrated in FIG. 1 and comprises a plating tank 10 containing a suitable plating solution, a trough conveyor 12 pivotally mounted within the plating bath, supply means 14 for directing items to be plated into the trough, and conveyor means 16 operative to remove plated items from the bath. Trough conveyor 12 includes an elongated trough of channel-shaped cross-section formed of an electrically insulative material, typically plastic, which is compatible with the fluid in which it is immersed. The trough 18 is disposed below the surface of the plating solution and arranged for motion within the plating tank along the longitudinal axis thereof. Trough 18 is pivotally supported by hangers 20 and 22 disposed near respective opposite ends thereof, the hangers being pivotally attached at their lower ends to trough 18 and pivotally attached at their upper ends to a rigid support 24. The trough is thus supported by a parallel suspension system which allows pivotal parallel motion thereof; in other words, longitudinally and upwardly motion parallel to the plating bath surface.

A supply pipe 26 is disposed within the plating bath with its orifice or orifices oriented centrally of trough 18 to provide a controlled flow through or into the trough to suit particular process requirements. A conductive rod or plate 28 disposed in the bottom surface of trough 18 serves as the cathode electrode while an elongated perforated member 30, or basket, disposed within or above trough 18 serves as the anode electrode. Other well known electrode configurations, such as anode hangers or danglers can also be employed. Electrical connection is made from cathode 28 to cathode bus bar 32 by means of a cable 34 which extends from bus bar 32 through hanger 20 to cathode plate 28. Electrical connection is made to the anode from anode bus bar 36 by means of a rigid conductive member 38 which can also serve to physically support anode 30 in its position within the trough 18. Conductive member 38 can of course be electrically insulated to reduce shock hazard.

Motion is imparted to the trough conveyor assembly by means of a cam 40 which is rotatably driven in a clockwise direction by suitable motive means, the cam cooperating with a cam follower 42, attached to or formed as part of hanger 22, in a manner to provide the novel plating operation according to the principles of the invention. The motive means can be electrical, hydraulic or pneumatic. A spring 44 attached between a support 46 and hanger 20 urges trough 18 and its associated suspension assembly into positive contact with the camming surface of cam 40. Alternatively, two cams or a two lobed cam may be used, in place of the single cam and spring illustrated, to provide the requisite forward and rearward trough motion. In some instances, return of the trough can be simply via gravity, and motion in either direction can be accelerative to achieve particular trough movement.

According to the invention, the trough conveyor assembly 12 is effective to transport items being plated through the plating solution in an effectively continuous manner by use of unique periodic movement which achieves uniform and complete plating. The unique periodic movement of the items being plated is accomplished by trough 18 which is caused to move longitudinally and upwardly in a first direction, thereby to longitudinally and upwardly transport items within the trough, and caused to move abruptly in an opposite direction, rapidly returning the trough to a rest position whereupon the items are momentarily suspended within the plating solution and are caused to fall onto the bottom surface of the trough in a position forward of their former position. The trough motion continues sequentially to increment the items along the trough, the items moving generally in a periodic fashion so that they are completely and continuously plated as they move through the plating solution by virtue of the novel system operation.

To achieve the novel trough motion, cam 40 is caused to rotate in a clockwise direction as illustrated in FIG. 1 by an arrow, causing trough 18 to move leftwardly and upwardly as seen in FIG. 1 as cam surface 48 cooperates with follower 42. When cam follower 42 reaches the abrupt discontinuity in camming surface 48, trough 18 is rapidly returned to the rest position, as illustrated, by the urging of spring 44 to provide the necessary abrupt return motion of the trough. The extent of trough movement is determined by the particular characteristics and location of cam 40 in conjunction with the dimensions of the hanger supports, while the frequency of trough motion is determined by the speed of rotation of cam 40. Particular degrees of trough motion and frequency can be determined to suit the requirements of specific plating operations. It should be understood, however, that the movement, in accordance herewith, is not vibratory in nature, but rather sequential with momentary periods of rest during the actual plating portion of the sequence and at the uppermost point of movement in accordance with the particular plating demands.

The periodic trough motion lends itself to interruption of plating current during portions of the periodic cycle. Plating occurs essentially during the time when the items are in contact with the cathode disposed in the trough, that is, during forward motion of the trough. To conserve power, or to modify the plating process, current can be switched off during return movement of the trough when the items are caused to fall through the bath to their reoriented positions forwardly of the trough. Such current interruption can be accomplished by a suitable switch activated by the trough conveyor, for example, by the cam 40 or one of the hangers 20 and 22. Suitable means may be usef to halt the trough motion to increase or decrease the duration of the plating cycle.

In operation of the device as shown in FIG. 1, items to be plated are contained within supply bin 14 and are delivered by means of a chute 50 to the supply end of trough 18. Items can be fed from the supply bin to the plating bath, for example, by means of a well known vibratory feed mechanism contained within bin 14. The items are deposited at the supply end of trough 18 in a random manner and these items are conveyed through the plating solution by the novel motion of trough 18, the items being periodically deposited by the cyclic action of trough 18 on successively leftward positions of the trough. The items experience sufficient random orientations during their progression through the solution such that all surfaces thereof are exposed to the plating solution. A continuous and uniform coating is thereby achieved by the cyclic conveyance provided by the invention. Items at the leftmost end of trough 18 are transported by the same periodic movement onto conveyor 16 by which the plated items are removed from the plating bath. The items may then be transported by suitable conveyor means to subsequent baths for further plating operations or for cleaning or rinsing. Subsequent operations can be conducted by systems substantially similar to that described hereinabove, as can preplating operations such as degreasing.

Figure 3:
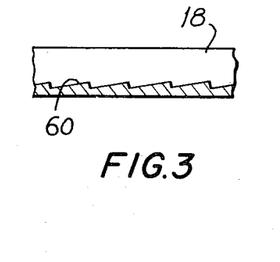
FIG. 3 is a sectional cut-away view of an alternative embodiment of the trough of FIG. 1.

Variations in the particular implementation of the invention can be made to suit process requirements. For example, thr trough bottom can be configured to aid the orientation of articles as they fall thereon by virtue of the unique periodic trough motion. One such configured trough is illustrated in FIG. 3 and includes a plurality of inclined surfaces 60 arranged across the width of the trough and inclined longitudinally thereof, and appearing in the illustrated longitudinal section as a saw-tooth pattern. As a trough with this configured bottom surface moves abruptly to its rest position (to the right in the figure) items being conveyed fall onto the inclined surfaces an tend to tumble downwardly of the inclines. Normal arrangements of individual trough sections or levels, however, will preferably be parallel to the liquid surface. Rearward inclination is used to increase plating time, where forward inclination is used to accelerate forward movement and decrease plating time. Acceleration in the downward and rearward direction may also be used to increase the tumbling action.

Thus, reorientation of items during their path through the bath is achieved to permit plating of all item surfaces. In some instances, the cathode electrode is preferably non-continuous and such cathode can be implemented in the invention by providing discrete conductive areas along the length of the trough bottom.

Tandem or cascade operation can be provided by use of multiple troughs, mounted for motion as described hereinabove, and the trough can be partitioned along the length to provide, in effect, separate troughs useful, for example, in processing articles which tend to nest or become entangled.

Modifications in the trough suspension and conveyor assemblies can also be made. For example, in place of the parallel suspension described hereinabove, a plurality of resilient members attached to or formed as part of the trough can be employed to support the trough and permit requisite motion. The resilient supports can be of a plastic material suitable to allow the necessary bending required to achieve the unique periodic trough motion, and offer the advantage of eliminating bearings or pivots within the bath.

Figures 4, 5, 6:
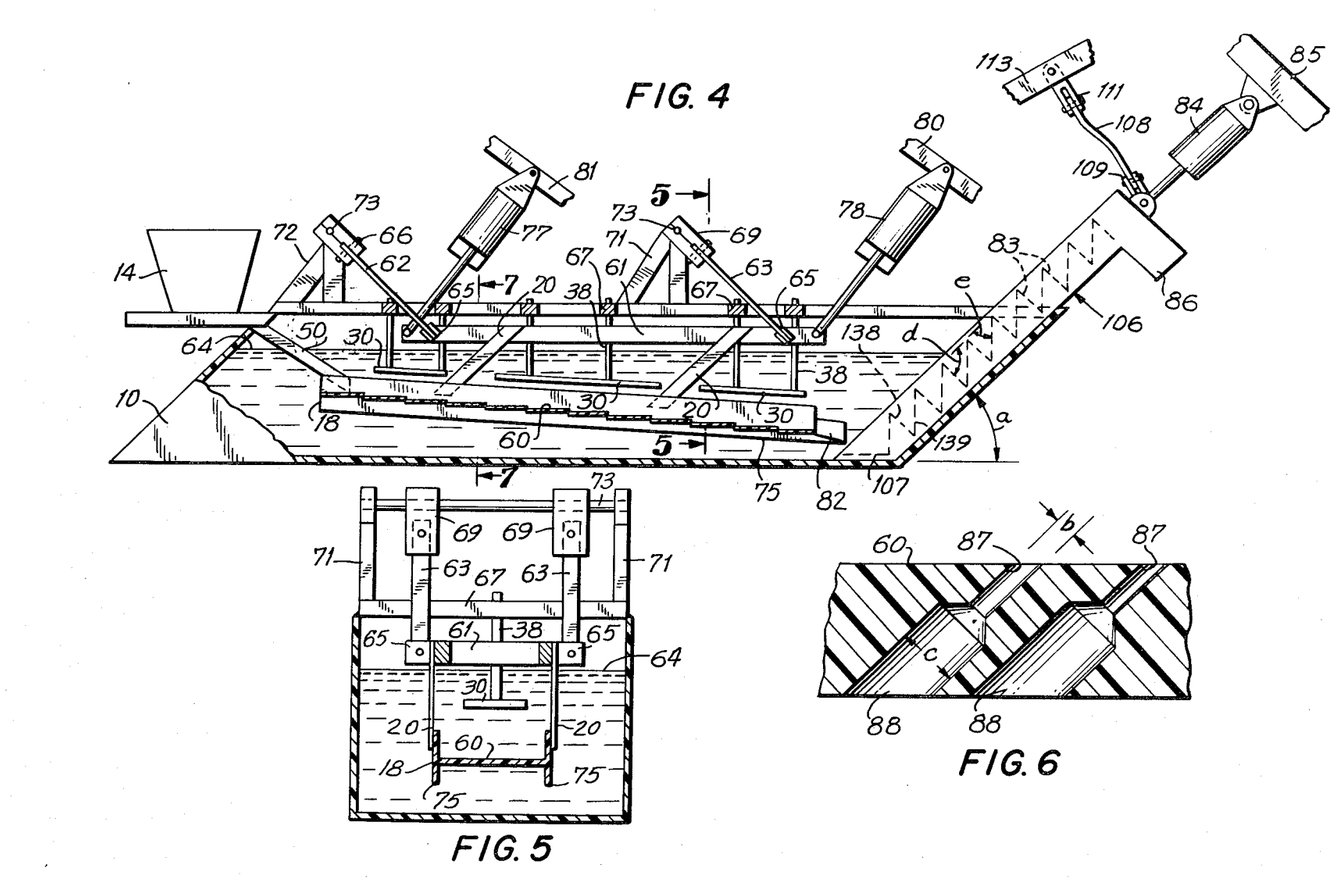
FIG. 4 is a diagrammatic elevational view of a modified form of the plating system shown in FIG. 1, and including mechanical aspects of apparatus embodying and for practicing this invention.
FIG. 5 is a view in cross-section taken along lines 5—5 of FIG. 4.
FIG. 6 is a sectional view of a portion of the trough of FIG. 4 and giving a detailed showing of the configuration of perforations in the trough floor.

FIG. 4 is a side elevational view of the plating system of FIG. 1 in which the suspension system and the means for moving trough 18 have been modified and with the direction of movement reversed with work pieces moving from left to right. For example, disposed immediately above trough 18 is a movable frame 61 which is rigidly connected to trough 18 as by spaced apart struts 20. Thus, the trough 18 and the movable frame move together cyclically in a first direction longitudinally and upwardly within tank 10 and abruptly returning to the initial position. Movable frame 61 is supported on two pairs of spaced apart upright supports 71 and 72 disposed on either side of the edge of tank 10. Connection is made between the upright supports 71 and 72 and movable frame 61 as through two pairs of spaced apart flexible struts 62 and 63, which may be comprised of any flexible material appropriate for the size and design requirements of the apparatus. Flexible steel struts or non-metallic flexible material such as fiber glass, for example, have proved appropriate. It should be understood that the number of struts may be increased or decreased depending upon the size of trough 18 and the load requirements of a particular plating operation.

These flexible struts are connected to movable frame 61 by pairs of spaced apart clamps 65 which hold the lower ends of the flexible struts 62 and 63 rigidly in place. A similar two pairs of spaced apart clamps 66 and 69 are rotatably disposed on cross bars 73 extending between the uprights 71 and 72 on the tank edges.

Thus, the movable frame with the trough 18 depending therefrom is supported for movement as through the two pairs of flexible struts 62 and 63. With such an arrangement, bearings or other interrelated movable parts are avoided at the connection between the flexible struts and the movable frame in the vicinity of the plating bath thus avoiding deterioration of the supporting structure from the corrosive environment of the plating bath.

Movement for the movable supporting frame 61 and its associated trough 18 is achieved through the action of two pairs of double acting piston and cylinder arrangements 77 and 78 spaced apart so as to connect to each end of movable frame 61. Only a single one of each pair is shown. Thus, by appropriate controls, as well known, pressure fluid is fed into first one end and then the other end of the pressure fluid acting cylinders to cause first a longitudinally and upwardly movement of the movable frame and its depending trough 18 and then an abrupt reversal back to the initial position. The various piston and cylinders are pivotally supported on frame supports 80 and 81. It should be understood that more than or less than two pairs of cylinders may be used, depending upon the load requirements and size of a particular trough. The action of the reversible piston and cylinder arrangements 77 and 78 may be through pneumatic action or hydraulic action, as well known. The movement of the double acting cylinders 77 and 78 may be achieved through a variety of different control methods, as well known, in order to provide appropriate time intervals between the upward action of the pistons and the lowering action of the pistons and for the required dwell time required in electroplating.

For example, as is shown in FIG. 11, electric motor 120 drives cam shaft 122 through reduction gear arrangement 121, as well known. The electric motor 120, which preferably is a variable speed motor, and reduction gear 121 are disposed on base 125 as are pressure fluid valves 126 and 127 of any well known construction. Shaft 122 extends from reduction gear 121 and the opposite end is rotatably supported in upright 124, with shaft 122 carrying cams 128 and 129, respectively, arranged immediately adjacent valves 126 and 127.

The construction and operation of valves 126 and 127 are the same except that their associated cams are disposed differently on shaft 122 and may be configured differently. Thus, only valve 127 will be discussed.

Figure 12:
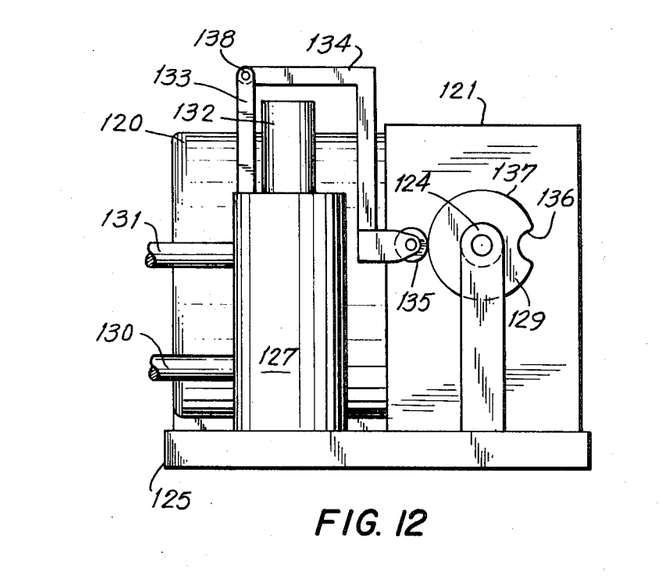
FIG. 12 is a side elevational view of the control of FIG. 11.

As can best be seen in FIG. 12, valve 127 receives compressed air as through port 130 from any well known source of compressed air, and discharges air to one end of cylinders 77 and 78, it being understood that valve 126 controls the opposite end of these cylinders. Through the action of valve 127 air is discharged through port 131 in a controlled manner for the operation of cylinders 77 and 78.

For example, plunger 132 of valve 127 is moved through the action of cam follower 135 as through linkage 134 supported for movement around pivot 138 on support 133. As long as cam follower 135 is following surface 137 of cam 129, either no air or continuous air is discharged through port 131. However, when cam follower 135 hits discontinuity 136 in surface 137, linkage 134 moves in a clockwise fashion around pivot 138, and depresses plunger 132 of valve 127, which in turn operates valve 127.

It should be understood that cams 128 and 129 are arranged on shaft 122 and their surfaces configured so that they coordinate the action of valves 126 and 127 for operating cylinders 77 and 78 as desired in order to provide appropriate dwell times and movement of trough conveyor 18. For example, if desired, a dwell period may be built into the cams used on the cam shaft to control the valves in order to hold the movable frame and associated trough at the top of the stroke of the pistons. The lower chambers of the cylinders may then be exhausted slightly before air is admitted to the upper chamber, as well known, in order to provide maximum downward and rearward acceleration of the supporting frame and associated trough. The cam may also be provided with means on its surface to permit immediate return of the trough to a dwell position with this dwell time permitting undisturbed contact of the work and the cathode electrode disposed along the floor of the trough. It is to be understood that cams of different configuration can be substituted in order to provide a different sequence of operation for a particular device in accordance herewith, depending upon what operations are being carried on by the device. In addition, variations in the speed of rotation of the cams can be made in order to vary the speed of the sequence of operations.

For example, using a trough 2 feet wide and 12 feet long, 2,000 pounds per hour of parts have been plated. The dwell was built into the cams for control of the pressure fluid actuated reversible cylinders of 5 seconds dwell time for the trough at the top of the stroke, with downward movement being 0.4 seconds and upward movement being 1 second. An air cushion was employed at the end of the down stroke in order to eliminate shock, in well known manner.

In this connection, is should be noted that the angle of the supporting flexible members 62 and 63 to the vertical has an approximate linear relationship with movement of parts through the trough. Vertical positions produce maximum forward movement and little or no vertical movement with no appreciable liquid circulation. By contrast, horizontal positions produce no forward movement on a level trough but maximum vertical movement and liquid circulation. An angle of 45° for disposition of the flexible struts 62 and 63 from the vertical is preferred for producing optimum results.

Figures 8, 9:
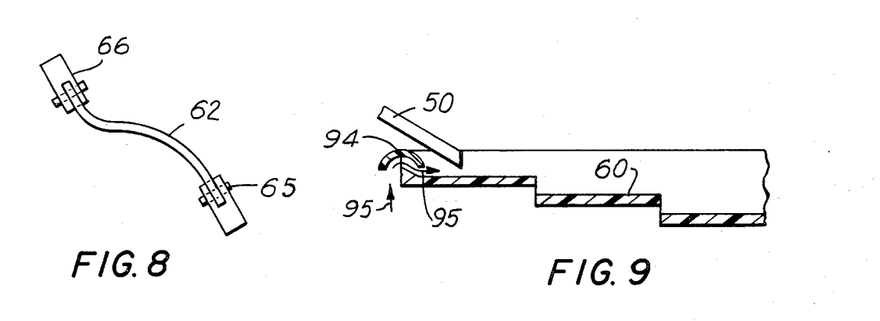
FIG. 8 is a detailed showing of one arrangement of the flexible supporting struts shown in FIG. 1.
FIG. 9 is a longitudinal sectional view of the trough floor showing a modified arrangement thereof and including mechanical aspects of apparatus embodying and for practicing this invention.

If desired, the flexible supporting struts 62 and 63 may be used to increase the downward and rearward velocity by locking the supporting cross shaft 73 in a position which establishes the desired spring force. Such an arrangement is shown in FIG. 8 in which the flexible strut 62 is arranged in the curve shown. A reverse configuration will augment upward movement.

With regard to the rigid support struts 20 disposed between movable frame 61 and the depending trough 18, these supports are angled, as shown, to be substantially parallel to the general direction of downward and rearward motion of the device for establishing a substantially concentric loading on the supports and for reducing stresses other than sheer on the support mountings.

As has been noted before, the hydraulic action of the plating fluid in the tank 10 plays an important part in connection with the movement of the trough for moving the work pieces through the trough. For this reason, various components of the trough proper are configured in order to take advantage of this hydraulic action for enhancing the movement and reorientation of the parts along the various levels of floor 60 of the trough.

One form of trough floor 60 is perforated in order to enhance the entry of plating fluid into the trough an in and around the parts to be plated. These perforations are in the form of bores disposed throughout the trough floor. FIG. 6 is a section through two of these bores and shows the configuration of the bores for enhancing the utilization of plating fluid flow for moving and tumbling parts of the trough floor 60. The upper part of bores 87 are smaller than the lower counter-bore 88. Generally, the upper and smaller bore 87 has a diameter of one-half that of the lower counter-bore. With a trough 12 long and 2 feet wide, and having 1 foot sections at each level of trough floor 60, is has proved appropriate to have distance designated $b$ in FIG. 6 of three-sixteenths inch and distance designated $c$ in FIG. 6 at three-eighths inch. With this size bore, satisfactory results have been achieved with about 400 perforations per square foot in the trough floor. Further, the perforations and/or bores in the trough floor 60 are inclined in the same manner as support 20 to help maintain the substantially concentric loading on the supports of the trough an to help avoid and/or reduce stresses on the support mountings.

One of the problems inherent in any electroplating environment is the fact that the plating bath liquid is deleterious to the parts associated with the equipment utilized for electroplating and also for any person who happens to be within the environment of the electroplating mechanism. For this reason, it is desirable and appropriate to avoid splashing if at all possible of the liquid electro-plating bath. The Applicant here has succeeded in avoiding such splashing by the utilization of extensions 75 (FIGS. 4 and 5) depending from the sides of the trough along the entire length thereof. These extensions 75 serve to dampen the hydraulic action which comes about when the trough is moving in a downward direction preventing a flow of liquid upwardly along the sides of the trough. Furthermore, these extensions 75 serve to enhance or force liquid up through the perforations, described above, in the trough floor.

As further means for avoiding splashing of the liquid of the electroplating bath as the trough moves in the bath, it has been found that the upper level of the trough is placed below the liquid level surface 64 at a distance within the range of between about 6 inches and 10 inches, and preferably 8 inches.

As can be seen in FIG. 4, anode trays 30 are disposed in a plurality of sections above the level of the trough. These anode trays 30 may obtain electrical connection from a series of bus bars extending across the tank, such as 67 in FIG. 5. These anode trays can carry anodes of the desired metal to be plated and in any desired configuration. It has been found convenient to use anodes in the form of balls for easy handling and replenishment. Electrical connections to the electrodes are not shown, for clarity, since they form no part of this invention.

Figure 7:
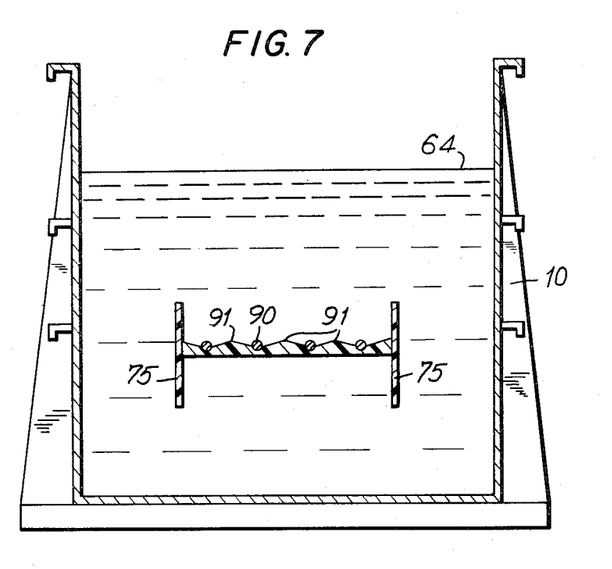
FIG. 7 is a cross-sectional view of the plating system of FIG. 1 taken along lines 7—7 of FIG. 1.

Although the trough floor may have various configurations for various purposes depending upon what electroplating operations are to be carried out, it has been found that the configuration shown in FIG. 7 provides enhanced results. FIG. 7 is a section taken along lines 7—7 of FIG. 4 with the supporting parts for trough 18 removed for clarity. As is shown, each section and/or level of trough floor 60 has disposed therein a plurality of spaced apart cathode electrodes 90 extending longitudinally along the entire length of the particular level. The rest of the floor of each level is comprised of any appropriate non-conductive material such as, for example, polyvinyl chloride. The non-electrical conducting portions of the trough floor are arranged in a series of longitudinally extending peaks 91 midway between each of the spaced apart electrodes 90. The angle of the trough floor between peaks 91 and the adjacent electrodes 90 is within the range of between about 6° and 10° from the horizontal plane of the trough floor 60 and preferably 7°.

With such an arrangement, the work pieces falling from one level to another on trough floor 60 will be caused to tumble toward the electrodes 90 as the work pieces move along the trough floor. In addition, because of this angle of inclination providing the series of spaced apart peaks and valleys along each level of the trough floor, there is an enhanced reorienting action for the parts. This is particularly helpful for small parts such as nuts and bolts which have a tendency to collect in one part or section of the floor and cover each other if they are not caused to continuously tumble and fall and move from one section to another during the operation, whether it be electroplating, cleaning, rinsing, etc.

Figure 10:
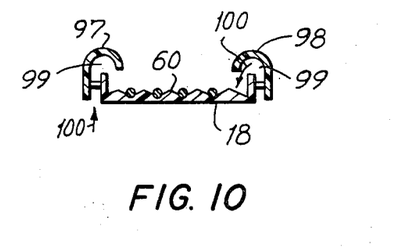
FIG. 10 is a cross-sectional view of the trough floor of FIG. 9.

In certain instances, when the work pieces are very small, such as pins, for example, or of a configuration which would cause problems of catching, etc. with perforations 87 in trough floor 60, it is appropriate to have a solid trough floor having no perforations such as those shown in FIG. 6. However, with such an arrangement, it has been found that fluid movement in certain portions of the trough tends to cause eddies because of the natural static layer of liquid on the smooth surface thus allowing certain parts to collect in one place and dwell too long in that place. In order to avoid this drawback, curved overhangs 97 and 98 (FIG. 10) are provided and extending over the edges of the trough and along the entire length of each level thereof. These overhangs cause, during descent of the trough, a forcing of the bath liquid through spaces 99 between the trough sides and the overhangs 97 and 98 in the direction of the arrows 100. This downward movement of fluid into that portion of the trough caused by the angle between the sides and the floor of the trough forces parts away from those sections of the trough where eddies would ordinarily occur. The same problem arises in the area immediately adjacent and and under the entry chute 50 which introduces parts into the trough at the beginning thereof. Thus, overhang 94 (FIG. 9) is disposed along the entire width of the trough at the entrance end thereof in order to produce liquid flow such as that designated by arrows 95, thus causing work pieces entering the trough at the entrance level to move forward and toward the next level below.

It should be understood that the arrangement in accordance herewith provides striking increases in the speed of movement of work pieces through the trough over any prior art devices. For example, using the electroplating process in conjunction with apparatus, in accordance herewith, and a solid trough floor, one-half inch No. 10 type A round head screws were zinc plated in 4 minutes, whereas in the past such plating would take about 45 minutes. This speed is even more striking when the plated screws were examined, as even the internal surfaces of the driving slot were plated, an area notoriously difficult to plate.

In place of continuous conveyor 16, as shown and described in FIG. 1, conveyor 106 may be used which is, in effect, a trough configured substantially the same as trough 18 only usually smaller in dimension. Trough conveyor 106 is inclined so that the various levels 83 thereof present a substantially stair arrangement with the individual steps 83 providing levels at which the work pieces are caused to jump from one to the other. The trough 106 is suspended from two pairs of spaced apart flexible supports 108 similar to the flexible supports 62 and 63. However, in this case, the flexible supports are arranged to be under tension in the manner shown and described in FIG. 8. Thus, clamps 111 hold their associated end of flexible supports 108 in a rigid manner in order to provide the tension in 108. Clamps 111 are in turn rigidly held by supporting frame 113. A similar pair of flexible struts 108 supports the lower or left hand end of conveyor 106 from frame 113. This pair has been removed for clarity so as not to obstruct the relation between trough 18 and conveyor 106.

The entire surfaces of both the landing portions and the riser portions of the individual steps 83 of conveyor 106 are foraminous to allow fluid in tank 10 to drain away from the work pieces moving up steps 83 through and out of the fluid.

It has been found appropriate to arrange the individual steps 83 at a desired angle in order to enhance movement of work pieces along steps 83 of conveyor 106. That is, the landing portions 138 of steps 83 are inclined counter-clockwise within the range of between about 7°–9° from a line perpendicular to the longitudinal axis of conveyor 106, and preferably 7°. Thus, angle $d$ is within the range of between about 81° and 85°, and preferably 83°, and angle $e$ is within the range of between about 35°–39°, and preferably 37°.

Conveyor 106 is caused to move through the action of a pair of spaced apart reversible piston and cylinder arrangements 84, which are in turn pivotally supported by supporting frame 85. It should be understood that conveyor 106 may be supported and moved by more or less supporting struts and piston and cylinder arrangements depending upon the size and load requirements of a particular plating operation.

In operation, parts coming off the right hand end of trough 18 fall through chute 82 onto the bottom level 107 of trough conveyor 106. Thereafter, through the action of the movement of the trough conveyor 106 the work pieces are caused to jump from one level 138 to another until they fall out of chute 86 at the top of trough conveyor 106 where they may fall into further treating tanks or chutes leading into subsequent tanks for further treatment, rinsing, etc., all in well known fashion.

Control of piston and cylinder arrangement 84 may be pneumatic and/or hydraulic in the same fashion as piston and cylinder arrangements 77 and 78. Preferably, it has been found that a pneumatic deive is appropriate with a variable speed electric motor driving a cam shaft for the valving control in the same manner as the drive for trough 18 described below. The only difference is that the cycle for conveyor 106 is cammed to dwell at the bottom of the stroke, and thereafter to accelerate rapidly to the top of the stroke. Following, there is a rapid deceleration by means of rapidly exhausting the lower portion of the cylinder chambers and admitting air to the upper side before the stroke is completed, all in well known manner. The combined action noted above causes the work pieces to move upwardly along the various steps 83 of the trough conveyor 106. Preferably, an air cushion is incorporated into the air cylinders for the bottom of their stroke. The angle a from the horizontal plane of tank 10 for trough conveyor 106 is within the range of between about 30°–45°, and preferably 32°.

Thus, as can be seen, arrangements are provided for electroplating large quantities of work pieces, particularly small parts, in a continuous and rapid manner through the application of relatively inexpensive apparatus requiring simple sources of power through the use of a new form of movement for the work piece holding structure in conjunction with novel but uncomplicated configurations of apparatus utilizing the hydraulic forces brought about by that movement, and in a manner which makes the invention, in accordance herewith, highly advantageous commercially. Furthermore, simple means are provided for changing the control of that movement, as desired, to conform with the requirements of a particular electroplating operation.

Other modifications and alternative implementations will now occur to those versed in the art without departing from the spirit and true scope of the invention. Accordingly, it is not intended to limit the invention by what has been particularly shown and described.

I claim:

1. In apparatus for conveying articles through a fluid bath and having a tank for containing a fluid, an elongated trough in said tank and supported for movement sequentially in a first direction longitudinally upwardly in said tank and then in a second direction longitudinally and downwardly to its initial position, and a supporting frame, the combination which comprises flexible means disposed between said trough and said frame for supporting said trough in its sequential movements, the end of said flexible support means adjacent said frame being mounted for rotation around an axis on said frame and the opposite end of said flexible support means being rigidly connected to said trough, power means disposed between said trough and said frame for moving said trough through its movements sequentially, means for supplying articles to one end of said trough, and means for removing articles from said tank as the articles in said trough exit from the opposite end thereof.

2. Apparatus as recited in claim 1 in which said means for removing articles from said tank is a conveyor trough disposed at the exit end of said trough at an angle of between about 30° and 45° from the horizontal plane passing through the bottom of said tank, the said conveyor trough being supported for movement through the plane of said angle, with the longitudinal section of the floor thereof being saw-toothed to form a series of substantially horizontal steps whereby movement of said conveyor trough causes articles passing therethrough to jump upwardly from one step thereof to another.

3. Apparatus as recited in claim 2 in which said conveyor trough is suppored by a plurality of flexible supports extending from the upper end thereof to said supporting frame with the ends of said flexible supports being rigidly connected to said conveyor trough and said supporting frame, and with said flexible supports being connected under tension to counteract the weight of said conveyor trough.

4. Apparatus as recited in claim 3 which includes a plurality of reversible double acting piston and cylinders connected between said supporting frame and said trough conveyor for providing the movement thereof.

5. Apparatus as recited in claim 4 which includes a control disposed between said source and said fluid actuated piston and cylinders, said control comprising a pair of pressure fluid valves operable between an open and closed position; a rotatable cam shaft extending along said pair of valves, a pair of cams disposed on said cam shaft with each one adjacent one of said valves, cam follower means disposed on said valves and extending against the surface of said cams, and means for rotating said cam shaft for moving said valves from a closed position to an open position and vice versa.

6. Apparatus as recited in claim 2 in which the said angle of the said conveyor trough is 32°.

7. Apparatus as recited in claim 2 in which each of the landing portions of said steps are disposed at an angle inclined counterclockwise within the range of between about 7°–9° from a line perpendicular to the longitudinal axis of said conveyor trough.

8. Apparatus as recited in claim 7 in which said angle is 7°.

9. Apparatus as recited in claim 2 in which each of the riser portions of said steps are disposed at an acute angle of within the range of between about 35°–39° from a plane drawn through the uppermost peaks formed by the intersections of said riser portions and said landing portions.

10. Apparatus as recited in claim 9 in which said angle is 37°.

* * * * *